US011500995B1

(12) United States Patent
Vidyadhara et al.

(10) Patent No.: US 11,500,995 B1
(45) Date of Patent: Nov. 15, 2022

(54) SECURE BOOT RUNTIME UNIVERSAL FILESYSTEM

(71) Applicant: Dell Products L.P., Round Rock, TX (US)

(72) Inventors: Sumanth Vidyadhara, Bangalore (IN); Vivek Viswanathan Iyer, Austin, TX (US); Shubham Kumar, Chakradharpur (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/240,787

(22) Filed: Apr. 26, 2021

(51) Int. Cl.
  *G06F 9/44* (2018.01)
  *G06F 21/57* (2013.01)
  *G06F 9/4401* (2018.01)

(52) U.S. Cl.
  CPC .......... *G06F 21/575* (2013.01); *G06F 9/4411* (2013.01)

(58) Field of Classification Search
  CPC combination set(s) only.
  See application file for complete search history.

(56) References Cited

U.S. PATENT DOCUMENTS

| 7,565,517 | B1* | 7/2009 | Arbon | G06F 8/64 713/1 |
| 7,644,264 | B1* | 1/2010 | Olsen | G06F 9/4416 719/321 |
| 7,882,345 | B1* | 2/2011 | Christensen | G06F 9/4416 713/1 |
| 10,095,662 | B1* | 10/2018 | Bondalapati | G06F 16/957 |
| 10,853,087 | B2* | 12/2020 | Khatri | G06F 9/4416 |
| 2018/0075242 | A1* | 3/2018 | Khatri | H04L 9/3263 |
| 2018/0276386 | A1* | 9/2018 | Roszak | G06F 9/4416 |
| 2019/0332425 | A1* | 10/2019 | Narayana | G06F 9/3851 |
| 2021/0240491 | A1* | 8/2021 | Downum | G06F 9/546 |

* cited by examiner

*Primary Examiner* — Zahid Choudhury
(74) *Attorney, Agent, or Firm* — Jackson Walker L.L.P.

(57) ABSTRACT

An information handling system may include at least one processor; and a computer-readable medium having instructions thereon that are executable by the at least one processor for: prior to initialization of an operating system, executing a pre-boot environment; and within the pre-boot environment, downloading a universal filesystem driver from a first back-end server and loading the universal filesystem driver in the pre-boot environment, wherein the universal filesystem driver is a single pre-boot firmware volume that comprises drivers for a plurality of different filesystems.

17 Claims, 9 Drawing Sheets

SECURE BOOT RUNTIME UNIVERSAL FILESYSTEM

TECHNICAL FIELD

The present disclosure relates in general to information handling systems, and more particularly to features of a pre-boot environment of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, there are many difficulties in accessing storage devices (e.g., hard drives, solid state drives, etc.) from a pre-boot environment of an information handling system such as a Unified Extensible Firmware Interface (UEFI) Basic Input/Output System (BIOS) pre-boot environment.

It is to be noted that various terms discussed herein are described in the UEFI Specification Version 2.8, released March 2019 (hereinafter, UEFI Specification), which is hereby incorporated by reference in its entirety. One of ordinary skill in the art with the benefit of this disclosure will understand its applicability to other specifications (e.g., prior or successor versions of the UEFI Specification). Further, some embodiments may be applicable to different technologies other than UEFI.

It may be desirable to embed multiple filesystem drivers into a pre-boot environment in order to handle different filesystem types and sizes. (For example, a driver for FAT filesystems may have a limit of 4 GB, etc.)

Further, some pre-boot environments may connect to a remote server and load an image file for booting a cloud-based Service OS (SOS). But there is currently no satisfactory way to authenticate or verify such downloads (e.g., authentication may be possible at the level of an entire disk image, but not at the level of individual files within the image, which may individually implicate points of attack from a security standpoint).

Further, the increasing use of containerized/virtual machine architectures may give rise to additional considerations.

It would thus be desirable to have a universal filesystem driver available in the pre-boot phase that addresses the shortcomings of existing solutions.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with pre-boot environments for information handling systems may be reduced or eliminated.

In accordance with embodiments of the present disclosure, an information handling system may include at least one processor; and a computer-readable medium having instructions thereon that are executable by the at least one processor for: prior to initialization of an operating system, executing a pre-boot environment; and within the pre-boot environment, downloading a universal filesystem driver from a first back-end server and loading the universal filesystem driver in the pre-boot environment, wherein the universal filesystem driver is a single pre-boot firmware volume that comprises drivers for a plurality of different filesystems.

In accordance with these and other embodiments of the present disclosure, a method may include an information handling system executing a pre-boot environment prior to initialization of an operating system; and within the pre-boot environment, the information handling system downloading a universal filesystem driver from a first back-end server and loading the universal filesystem driver in the pre-boot environment, wherein the universal filesystem driver is a single pre-boot firmware volume that comprises drivers for a plurality of different filesystems.

In accordance with these and other embodiments of the present disclosure, an article of manufacture may include a non-transitory, computer-readable medium having computer-executable code thereon that is executable by a processor of an information handling system for: executing a pre-boot environment prior to initialization of an operating system; and within the pre-boot environment, downloading a universal filesystem driver from a first back-end server and loading the universal filesystem driver in the pre-boot environment, wherein the universal filesystem driver is a single pre-boot firmware volume that comprises drivers for a plurality of different filesystems.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 6, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
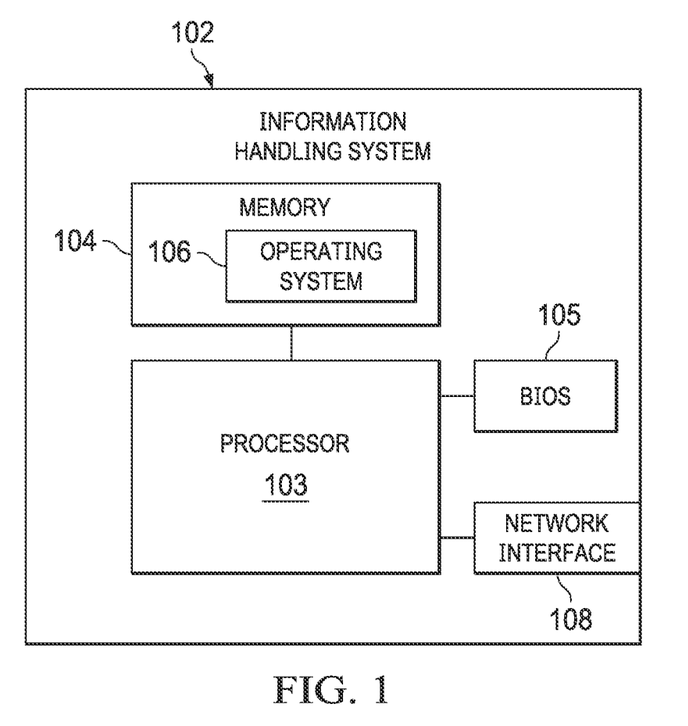
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

As discussed above, it would be desirable to have a universal filesystem driver available in the pre-boot phase of information handling system 102. Various embodiments of this disclosure may provide such functionality in different contexts. For example, some embodiments may be applicable in the context of "traditional" systems (e.g., non-virtualized, non-containerized systems). Other embodiments may be applicable in "modern" systems (e.g., virtualized and/or containerized systems), which may use a virtual machine manager (VMM) such as a hypervisor.

Figure 2:
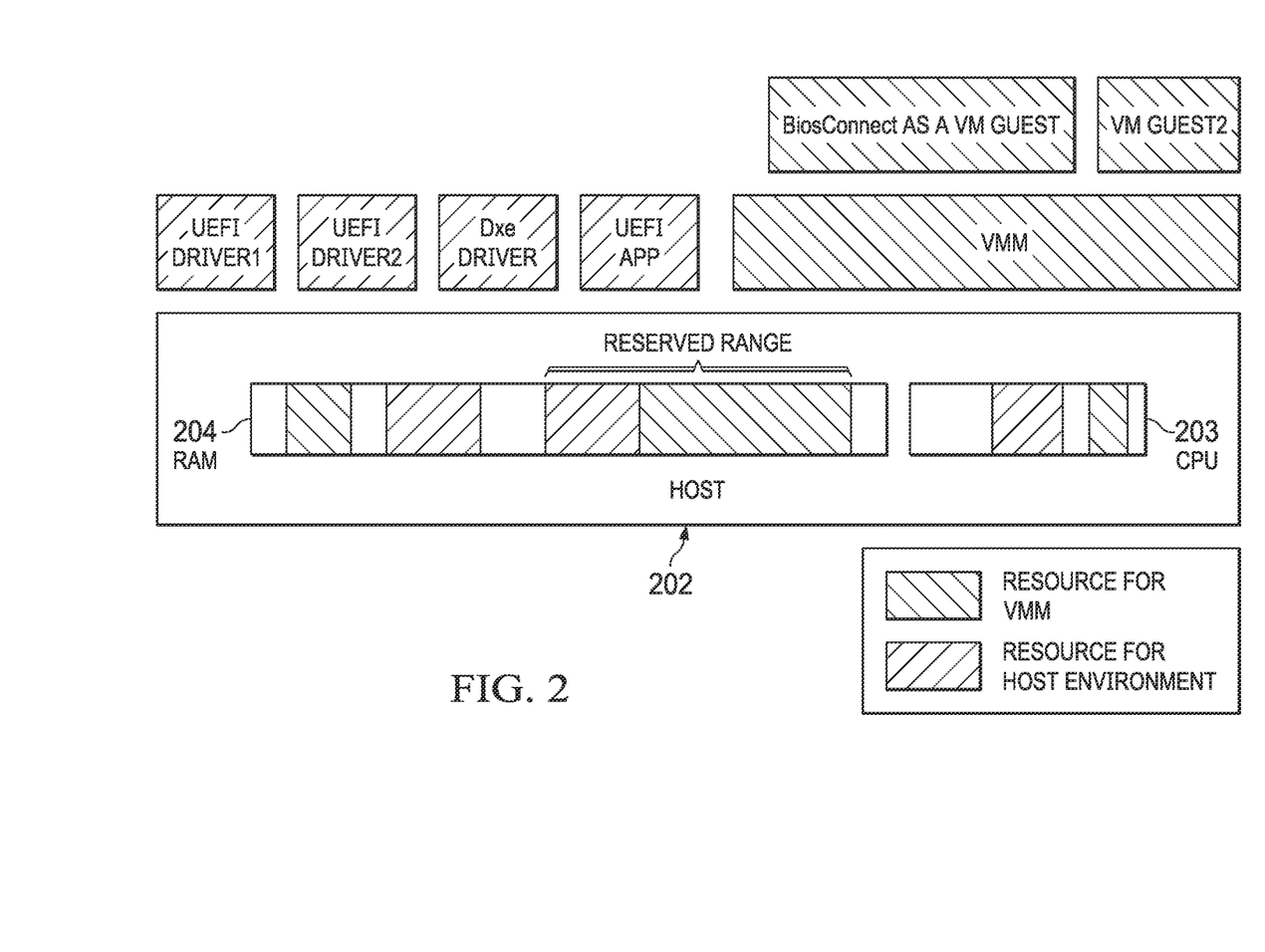
FIG. 2 illustrates a block diagram of an example information handling system, in accordance with embodiments of the present disclosure.

For context, FIG. 2 illustrates a block diagram of an information handling system configured for a modern use case. Host 202 is illustrated schematically, including CPU 203 and RAM 204. Various portions of these hardware resources are respectively reserved for VMM use and for use by the host environment itself. In the host environment, various UEFI modules (shown as UEFI driver 1, UEFI driver 2, DXE (driver execution environment) driver, and UEFI app) may execute. In the VMM context, BIOSConnect or another platform may execute as a VM guest, and additional VM guests may also execute.

Figure 3A:
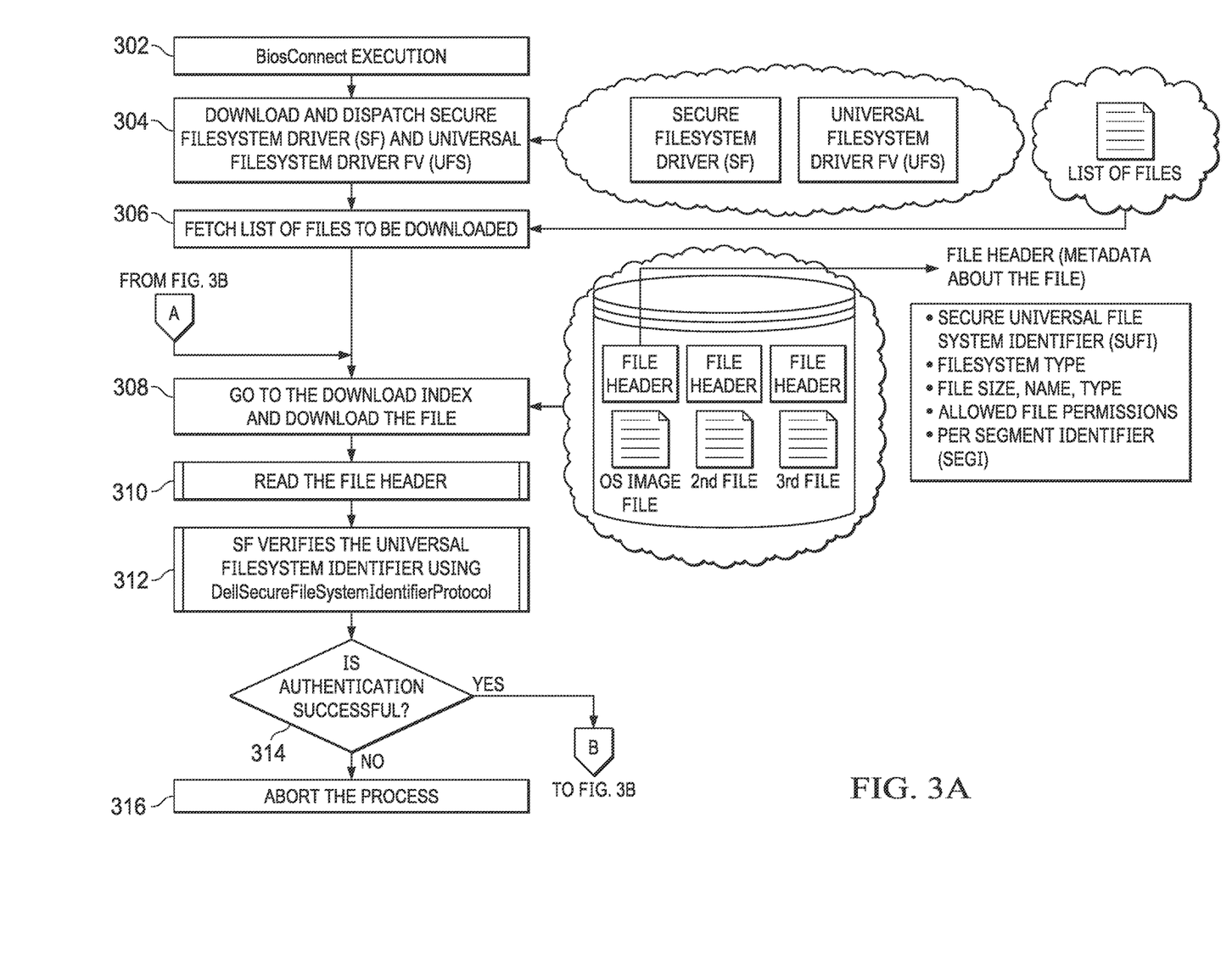
FIGS. 3A-3B, 4A-4B, 5A-5B, and 6 illustrate flow charts of methods, in accordance with embodiments of the present disclosure.
Figure 3B:
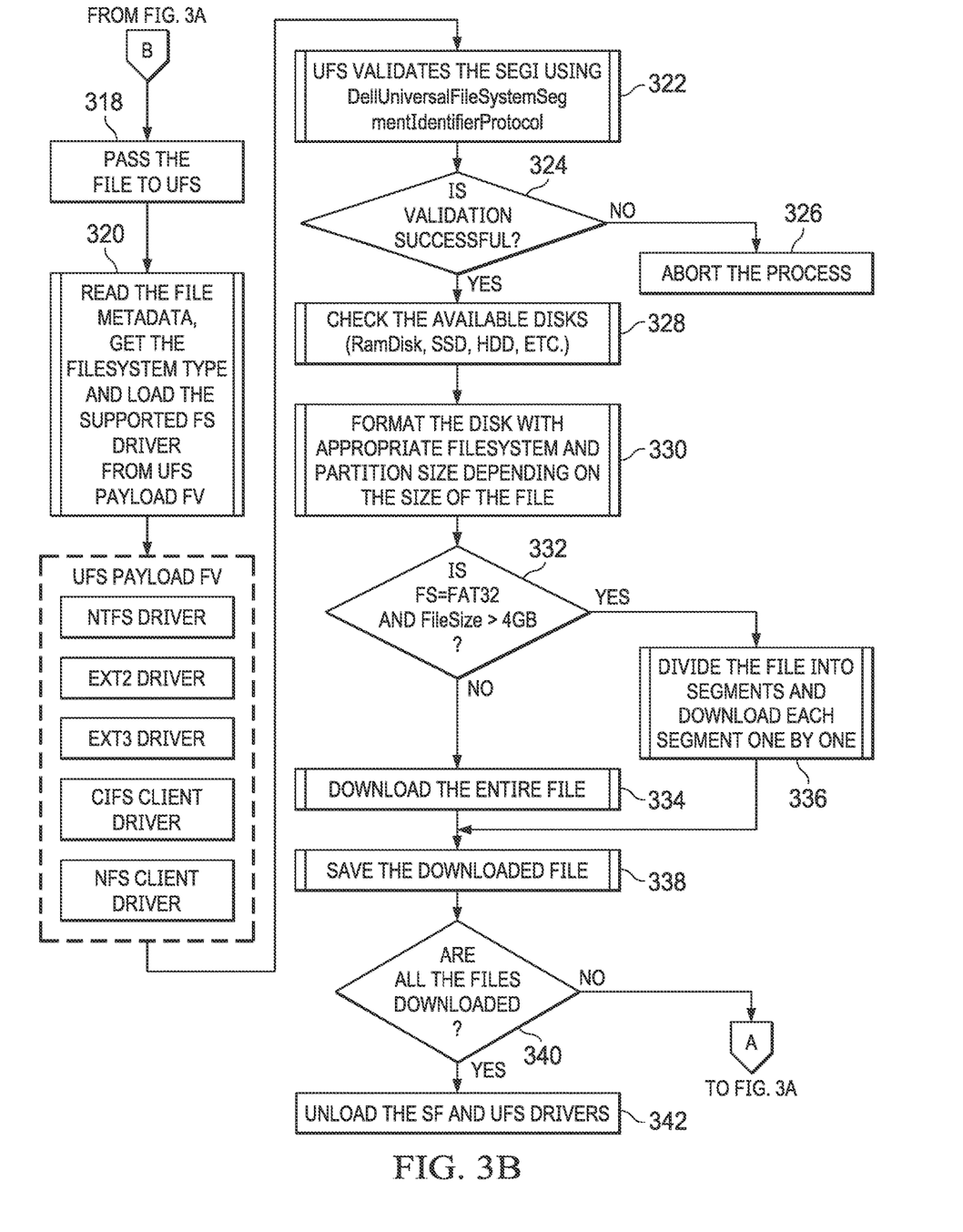

Turning now to FIGS. 3A and 3B, a flow chart of an example method for universal filesystems in the context of traditional systems is shown, in accordance with some embodiments. According to some embodiments, the method may begin at step 302. As noted above, teachings of the present disclosure may be implemented in a variety of configurations of information handling system 102. As such, the preferred initialization point for the method and the order of the steps comprising the method may depend on the implementation chosen.

This embodiment of the present disclosure may include a universal file system (UFS) driver implemented as a UEFI firmware volume (FV). This driver may be downloaded from a secure manufacturer back-end server at step 304 as part of a pre-boot flow at runtime in some embodiments, which is shown at step 302. (Dell's BIOSConnect is one example of such a platform which will be discussed herein. One of ordinary skill in the art with the benefit of this disclosure will understand that in various embodiments, other platforms may be used instead.) This FV may contains drivers for various file systems such as EXT2, EXT3, NTFS, CIFS, NFS, etc.

Each of the files that need to be downloaded as part of the pre-boot UEFI flow may be wrapped with a metadata format that contains: 1) a secure universal file system identifier (SUFI), indicating the filesystem type associated with the file; and 2) a per-segment identifier (SEGI) for verification of segments. A segment may be any desired size chunk of data, such as every 4 GB in some embodiments.

A secure filesystem (SF) driver may also be downloaded from the secure manufacturer back-end server as part of the pre-boot flow at runtime. This driver may have a protocol such as "Dell Secure Filesystem Identifier" in one embodiment, which may be used to validate each downloaded file's SUFI, with the first file being a list of the files that are to be downloaded. See step 306-312. If the validation is unsuccessful, the process may be aborted at step 316.

Otherwise, once the SF driver validates each file, the file may then be passed to the UFS driver for handling at step 314. FIG. 3B illustrates the operation of the UFS component.

UFS may then read the metadata of the file and get the file type to trigger loading of the appropriate filesystem code within the UFS driver at step 320. The UFS may validate each segment of the file based on its SEGI at step 322. the validation is unsuccessful, the process may be aborted at step 326.

Otherwise, once the UFS validates each segment, then at steps 328-340, additional processing of the file takes place. In particular, UFS may allow for the filesystem driver that has been selected and loaded to consume the file, either one segment at a time or all at once in various embodiments. (For example, FAT32 has a limit of 4 GB, and so a segment-based approach may be used in that situation.)

As UFS consumes the file, it may format an area (e.g., located on a RAMDISK, a solid state drive, a hard drive, etc.) with the appropriate filesystem format as needed. The SF driver may then move on to the next file requested from the secure back-end server. Once the SF finishes handling all files, then UFS and SF UEFI drivers may be unloaded at step 342. If there are additional files, the method may loop back to step 308 of FIG. 3A for additional processing.

Although FIGS. 3A and 3B disclose a particular number of steps to be taken with respect to the disclosed method, the method may be executed with greater or fewer steps than those depicted in FIGS. 3A and 3B. In addition, although FIGS. 3A and 3B disclose a certain order of steps to be taken with respect to the method, the steps may be completed in any suitable order.

The method of FIGS. 3A and 3B may be implemented using information handling system 102 and/or any other system operable to implement the method. In certain embodiments, the method may be implemented partially or fully in software and/or firmware embodied in computer-readable media.

Figure 4A:
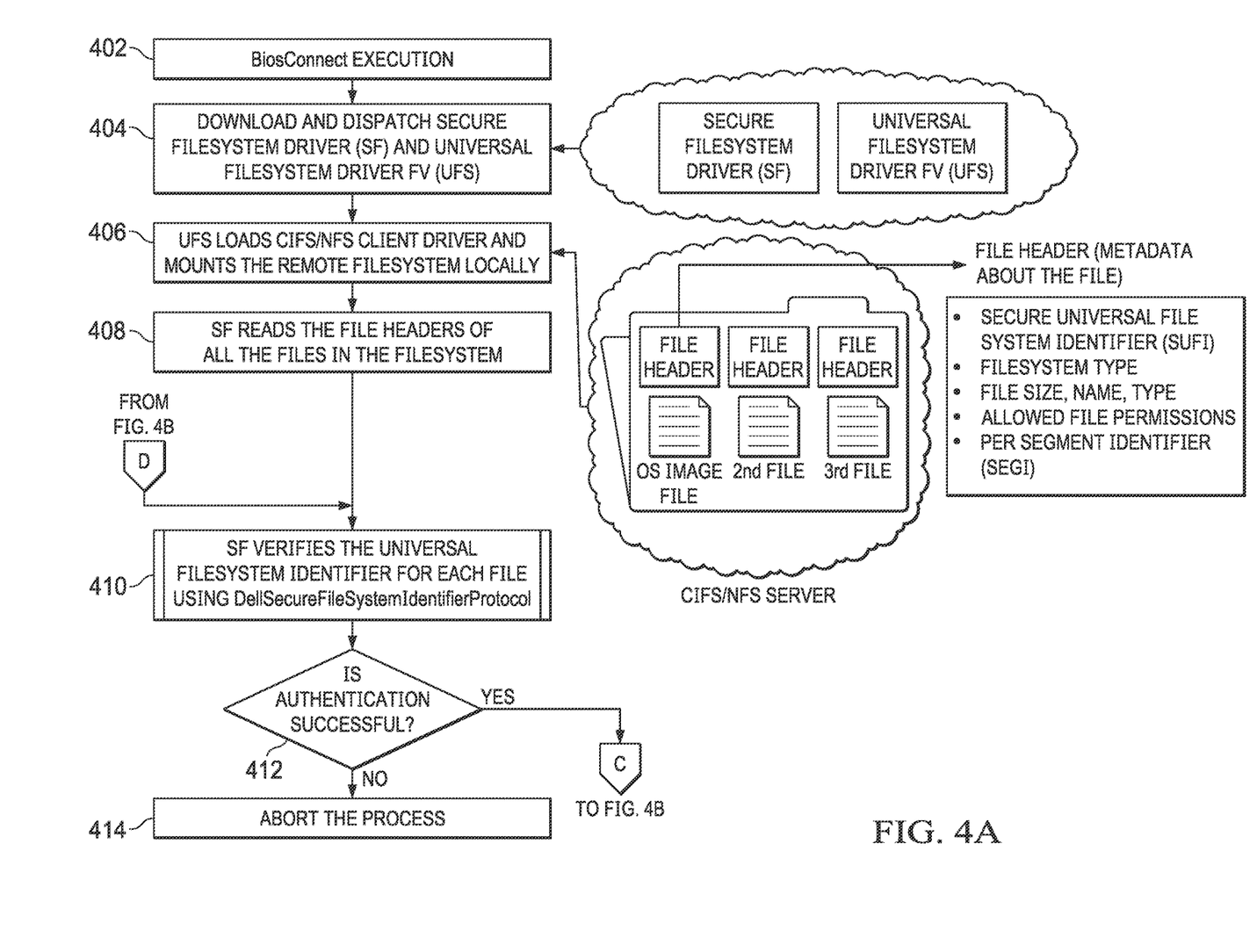
Figure 4B:
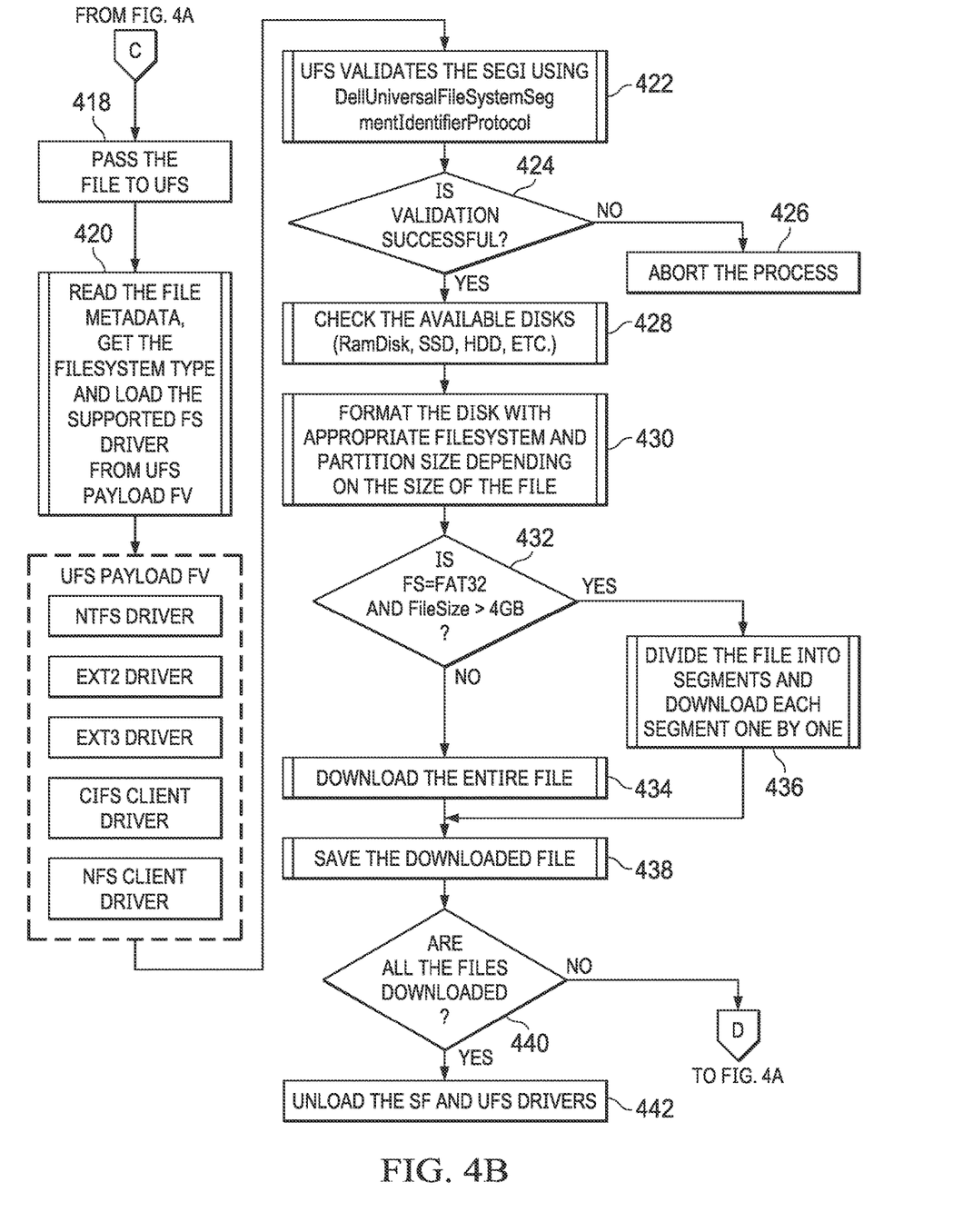

Turning now to FIGS. 4A and 4B, a flow chart of another example method for universal filesystems in the context of traditional systems is shown, in accordance with some embodiments. According to some embodiments, the method may begin at step 402. As noted above, teachings of the present disclosure may be implemented in a variety of configurations of information handling system 102. As such, the preferred initialization point for the method and the order of the steps comprising the method may depend on the implementation chosen.

In FIGS. 4A and 4B, a CIFS/NFS file manifest is used instead of a local manifest. For the sake of brevity, only the differences of FIGS. 4A and 4B relative to FIGS. 3A and 3B will be discussed in detail.

In particular, in the method of FIGS. 4A and 4B, UFS may load a CIFS/NFS client driver at step 406 and mount the remote filesystem locally. At step 408, the SF may read the file headers of all the files in the file system. The remainder of the method of FIGS. 4A and 4B may be carried out largely in similar fashion to that of FIGS. 3A and 3B.

Although FIGS. 4A and 4B disclose a particular number of steps to be taken with respect to the disclosed method, the method may be executed with greater or fewer steps than those depicted in FIGS. 4A and 4B. In addition, although FIGS. 4A and 4B disclose a certain order of steps to be taken with respect to the method, the steps may be completed in any suitable order.

The method of FIGS. 4A and 4B may be implemented using information handling system 102 and/or any other system operable to implement the method. In certain embodiments, the method may be implemented partially or fully in software and/or firmware embodied in computer-readable media.

Figure 5A:
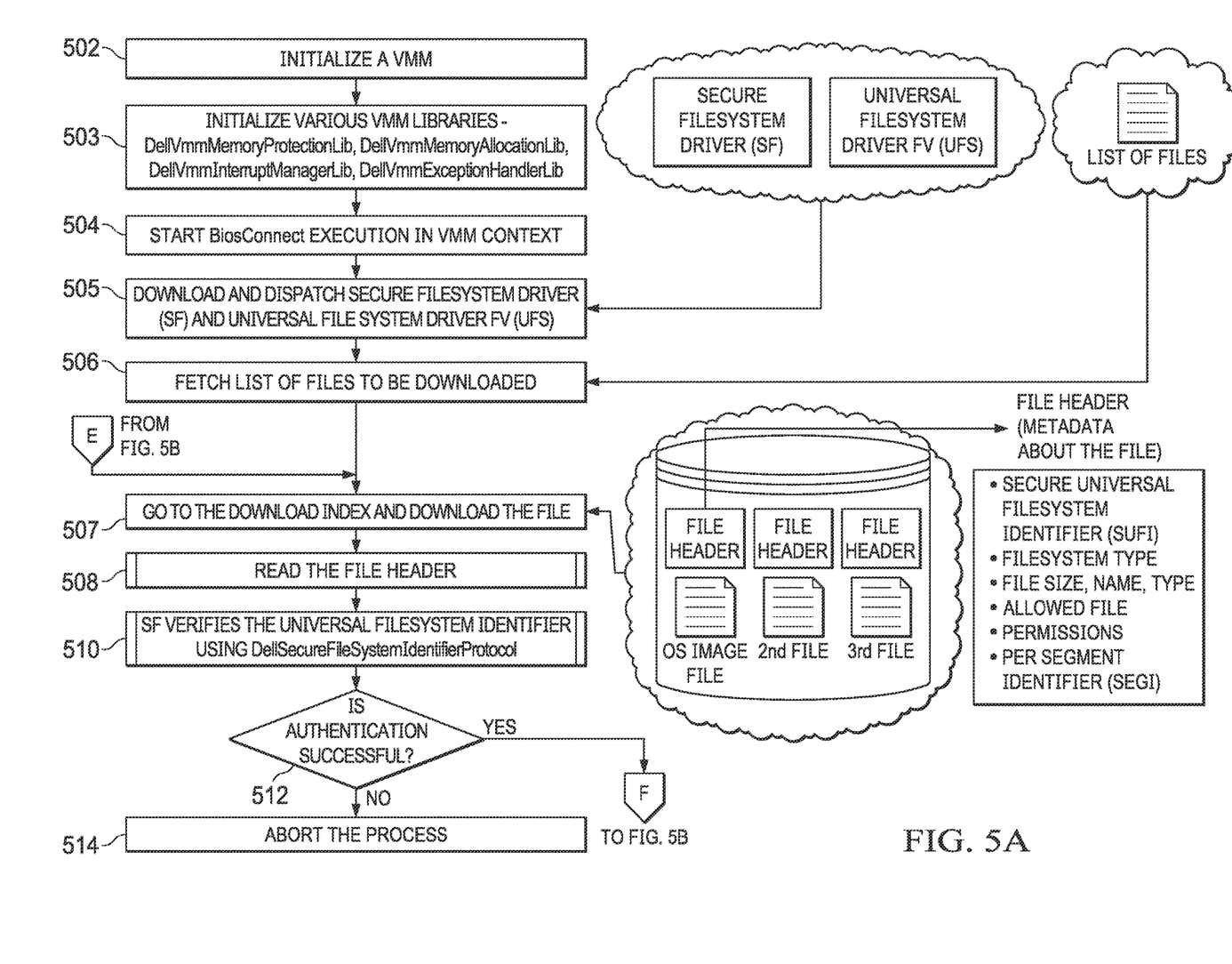
Figure 5B:
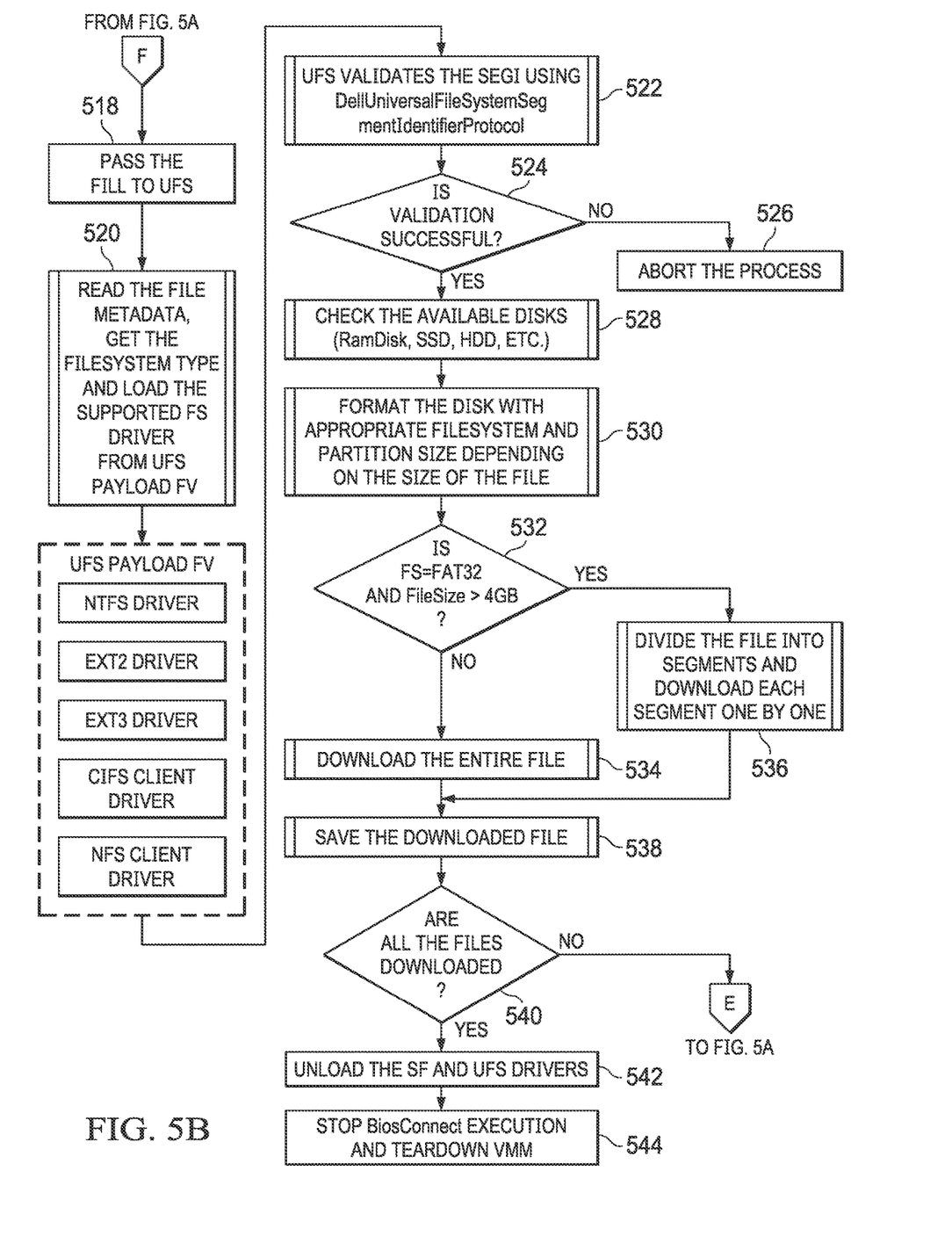

Turning now to FIGS. 5A and 5B, a flow chart of an example method for universal filesystems in the context of modern systems is shown, in accordance with some embodiments. According to some embodiments, the method may begin at step 502. As noted above, teachings of the present disclosure may be implemented in a variety of configurations of information handling system 102. As such, the preferred initialization point for the method and the order of the steps comprising the method may depend on the implementation chosen.

A VMM may first be launched on the host system at step 502. This VMM will then have access to various system resources. Various VMM drivers may be initialized at step 503 (e.g., drivers for memory protection and allocation, interrupt management, exception handling, etc.). Various drivers needed to launch a pre-boot platform such as BIOSConnect may be loaded in the VMM context, and then the pre-boot platform may start execution as a VMM guest at step 504.

The UFS driver FV mentioned above with respect to FIGS. 3A and 3B may be downloaded in the VMM context from the pre-boot platform at runtime at step 505. Each of the files that need to be downloaded as part of the pre-boot UEFI flow may be wrapped with a metadata format that contains the SUFI and SEGI mentioned above. The SF driver mentioned above may also be downloaded in the VMM context.

Certain portions of FIGS. 5A and 5B are generally similar to corresponding portions of FIGS. 3A, 3B, 4A, and 4B, and thus for the sake of brevity they are not discussed in detail.

As above, once the SF driver validates each file, the file may then be passed to UFS to handle. UFS may read the metadata of the file and get the file type to trigger loading of the appropriate filesystem code within the UFS driver. The UFS may validate each segment of the file based on its SEGI.

UFS then allows for the filesystem driver that has been selected and loaded to consume the file, either one segment at a time or all at once in various embodiments. (For example, FAT32 has a limit of 4 GB, and so a segment-based approach may be used in that situation.)

As UFS consumes the file, it may format an area (e.g., located on a RAMDISK, a solid state drive, a hard drive, etc.) with the appropriate filesystem format as needed. The SF driver may then move on to the next file requested from the secure back-end server.

While the SF or the UFS performs various file operations, there are still possibilities of malicious behavior or memory-related exceptions in the runtime. In case of any exception during Open( )/Read( )/Write( ) of files, an exception handler may handle the exception in the VMM environment. It can signal an event for saving the VMM execution context in the host context and resume the execution of the VMM after the exceptions have been handled.

Thus, exception handling in the VMM helps in maintaining the flow of UEFI execution without any issues while still handling the exceptions inside the VMM environment.

Once the SF finishes handling all files, then UFS and SF UEFI drivers may be unloaded. Finally, VMM teardown may proceed at step 544.

In some embodiments, the UFS driver FV may also be able to interact with any host-based filesystems in the VMM context, so that any exceptions or malicious code may be handled appropriately. Further, in the pre-boot context, a minimal VMM handler in the pre-boot UFS context may ensure the security of the filesystem layer to avoid any malicious code or rootkits.

Although FIGS. 5A and 5B disclose a particular number of steps to be taken with respect to the disclosed method, the method may be executed with greater or fewer steps than those depicted in FIGS. 5A and 5B. In addition, although FIGS. 5A and 5B disclose a certain order of steps to be taken with respect to the method, the steps may be completed in any suitable order.

The method of FIGS. 5A and 5B may be implemented using information handling system 102 and/or any other system operable to implement the method. In certain embodiments, the method may be implemented partially or fully in software and/or firmware embodied in computer-readable media.

Figure 6:
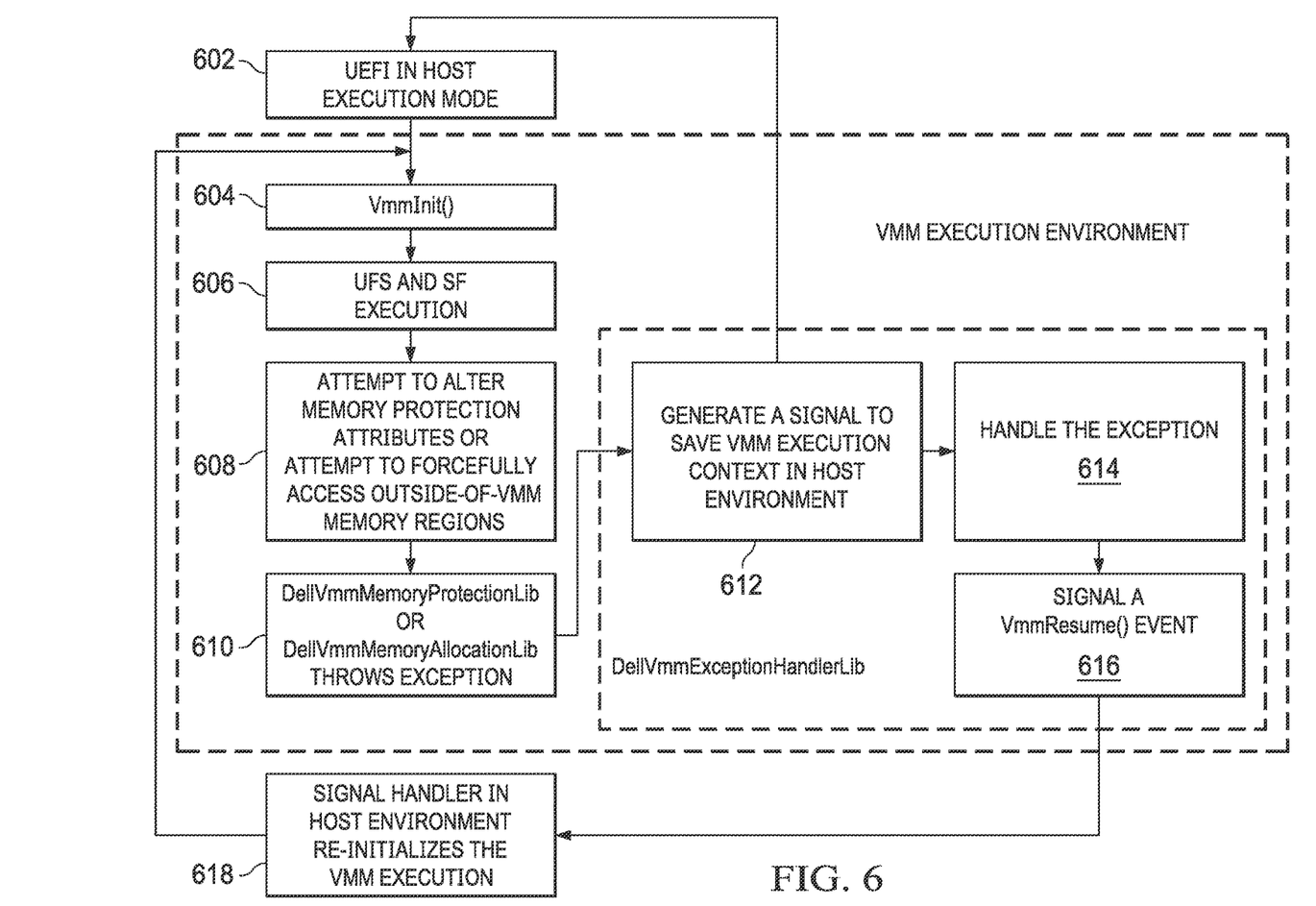

Turning now to FIG. 6, a flow chart of an example method for exception handling is shown, in accordance with some embodiments. According to some embodiments, the method may begin at step 602. As noted above, teachings of the present disclosure may be implemented in a variety of configurations of information handling system 102. As such, the preferred initialization point for the method and the order of the steps comprising the method may depend on the implementation chosen.

At step 602, the UEFI environment is in host execution mode. Starting with the VmmInit( ) function at step 604, the VMM execution environment may take over.

As noted above with respect to FIGS. 5A and 5B, the UFS and SF drivers may be executed at step 606. At step 608, a malicious or erroneous action may be taken by the executing code. For example, the code may attempt to alter memory protection attributes or access outside-of-VMM memory regions.

At step 610, the appropriate module may throw an exception. A VMM exception handler library may generate a signal at step 612 to save the VMM execution context in the host environment. The exception may then be handled at step 614, and a VmmResume( ) event may be signaled at step 616. Finally, a signal handler in the host environment may re-initialize the VMM execution at step 618, and flow may return to step 602.

Although FIG. 6 discloses a particular number of steps to be taken with respect to the disclosed method, the method may be executed with greater or fewer steps than those depicted in FIG. 6. In addition, although FIG. 6 discloses a certain order of steps to be taken with respect to the method, the steps may be completed in any suitable order.

The method of FIG. 6 may be implemented using information handling system 102 and/or any other system operable to implement the method. In certain embodiments, the method may be implemented partially or fully in software and/or firmware embodied in computer-readable media.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a computer-readable medium having instructions thereon that are executable by the at least one processor for:
   prior to initialization of an operating system, executing a pre-boot environment; and
   within the pre-boot environment, downloading a universal filesystem driver from a first back-end server and loading the universal filesystem driver in the pre-boot environment, wherein the universal filesystem driver is a single pre-boot firmware volume that comprises drivers for a plurality of different filesystems;
   wherein the pre-boot environment is further configured to download a file from a second back-end server, and wherein the downloaded file comprises metadata including a secure universal file system identifier that indicates a filesystem type associated with the file.

2. The information handling system of claim 1, wherein the pre-boot environment is a Unified Extensible Firmware Interface (UEFI) Basic Input/Output System (BIOS) pre-boot environment.

3. The information handling system of claim 1, wherein the second back-end server is a server of a manufacturer of the information handling system.

4. The information handling system of claim 1, wherein the first and second back-end servers are the same.

5. The information handling system of claim 1, wherein a specific filesystem driver is extracted from the universal filesystem driver and dispatched in the pre-boot environment based on the filesystem type associated with the file.

6. The information handling system of claim 1, wherein the downloaded file comprises metadata including a per-segment identifier for verification of segments of the downloaded file.

7. The information handling system of claim 1, wherein the downloaded file comprises executable code, and wherein the universal filesystem driver is configured to verify the downloaded file by checking for malicious behavior in the executable code.

8. A method comprising:
   an information handling system executing a pre-boot environment prior to initialization of an operating system;
   within the pre-boot environment, the information handling system downloading a universal filesystem driver from a first back-end server and loading the universal filesystem driver in the pre-boot environment, wherein the universal filesystem driver is a single pre-boot firmware volume that comprises drivers for a plurality of different filesystems; and
   the pre-boot environment downloading a file from a second back-end server, wherein the downloaded file comprises metadata including a secure universal file system identifier that indicates a filesystem type associated with the file.

9. The method of claim 8, wherein the pre-boot environment is a Unified Extensible Firmware Interface (UEFI) Basic Input/Output System (BIOS) pre-boot environment.

10. The method of claim 8, wherein the second back-end server is a server of a manufacturer of the information handling system.

11. The method of claim 8, wherein the downloaded file comprises metadata including a per-segment identifier for verification of segments of the downloaded file.

12. The method of claim 8, wherein the downloaded file comprises executable code, and wherein the method further comprises: the universal filesystem driver verifying the downloaded file by checking for malicious behavior in the executable code.

13. An article of manufacture comprising a non-transitory, computer-readable medium having computer-executable code thereon that is executable by a processor of an information handling system for:
   executing a pre-boot environment prior to initialization of an operating system;
   within the pre-boot environment, downloading a universal filesystem driver from a first back-end server and loading the universal filesystem driver in the pre-boot environment, wherein the universal filesystem driver is a single pre-boot firmware volume that comprises drivers for a plurality of different filesystems; and
   the pre-boot environment downloading a file from a second back-end server, wherein the downloaded file comprises metadata including a secure universal file system identifier that indicates a filesystem type associated with the file.

14. The article of claim 13, wherein the universal filesystem driver is further configured to read and write a host-based filesystem of the information handling system.

15. The article of claim 13, wherein the second back-end server is a server of a manufacturer of the information handling system.

16. The article of claim 13, wherein the downloaded file comprises metadata including a per-segment identifier for verification of segments of the downloaded file.

17. The article of claim 13, wherein the downloaded file comprises executable code, and wherein the universal filesystem driver is configured to verify the downloaded file by checking for malicious behavior in the executable code.

* * * * *